United States Patent [19]

Butler et al.

[11] 4,415,071
[45] Nov. 15, 1983

[54] DEVICE FOR BLEEDING BRAKES AND REFILLING BRAKE SYSTEM

[76] Inventors: Eric S. Butler; William H. Butler, Jr., both of Murfreesboro 37130; Malcolm H. Butler, Nashville, all of Tenn. 37212

[21] Appl. No.: 287,482

[22] Filed: Jul. 27, 1981

[51] Int. Cl.³ .............................................. B60T 11/30
[52] U.S. Cl. .................................................... 188/352
[58] Field of Search .................. 188/352, 151 A, 152; 141/392; 303/1–3

[56] References Cited

U.S. PATENT DOCUMENTS

| | | | |
|---|---|---|---|
| 1,825,013 | 9/1931 | Patton | 188/352 |
| 2,295,539 | 9/1942 | Beach | 188/352 |
| 3,339,401 | 9/1967 | Peters | 188/352 X |
| 3,548,978 | 12/1970 | Dyke | 188/352 |
| 3,730,307 | 5/1973 | Mitchell | 188/352 |
| 3,889,904 | 6/1975 | Jones et al. | 188/352 X |
| 4,170,280 | 10/1979 | Schwarz | 188/352 |
| 4,174,615 | 11/1979 | Kuhn | 188/352 X |

*Primary Examiner*—Douglas C. Butler

[57] ABSTRACT

A control unit affixed to an adjustable stand mounted on a platform on wheels, has an electrical on/off switch which controls the vacuum pump of the extractor unit, a brake fluid and air extractor control valve which controls the flow of air and brake fluid being extracted from the master cylinder and brake system, a brake fluid application control valve which controls the flow of brake fluid (free of air) from the brake fluid reservoir container (with bracket) affixed on top of the control unit, a vacuum meter indicator which indicates the amount of vacuum present, and a master cylinder brake reservoir top with U-bolt which fit securely over the master cylinder of an automobile or truck. The control unit is connected to the master cylinder brake reservoir top by a heavy duty dual function extractor/application hose. The master cylinder brake reservoir top can be modified to fit other motor vehicles.

An extractor unit mounted on a platform with wheels, has a vacuum pump which creates a suction action for pulling brake fluid and air out of the brake system, an extractor brake fluid collection container (with holes to reduce pressure) with bracket to hold the collection container, a junction box for electrical connections, a heavy duty extraction hose which connects the extractor unit to the control unit, and a collection hose which connects the collection container to the vacuum pump.

1 Claim, 20 Drawing Figures

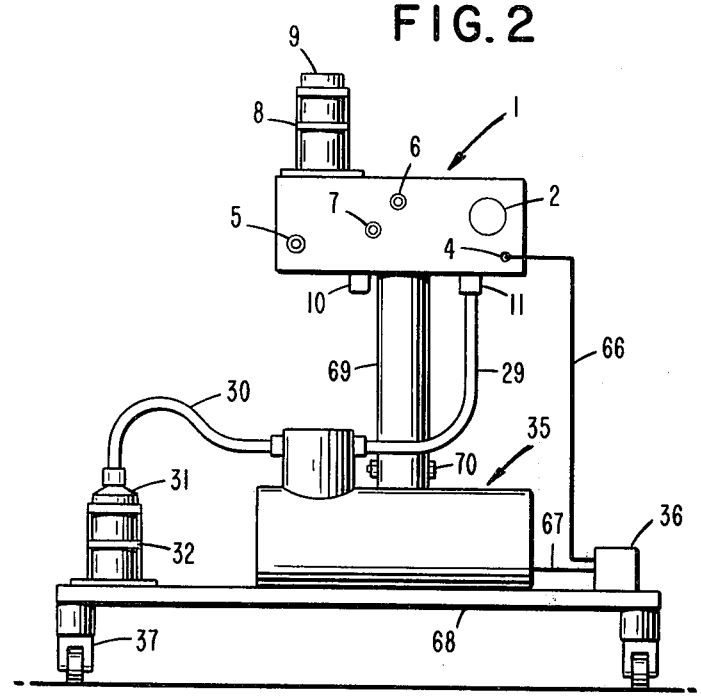
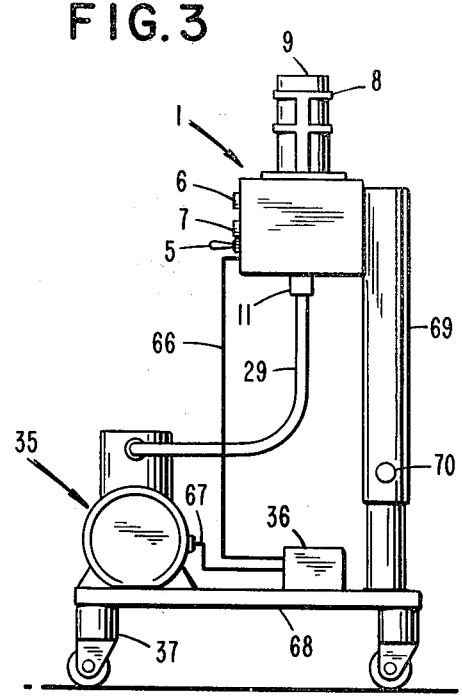
FIG. 2
FIG. 3
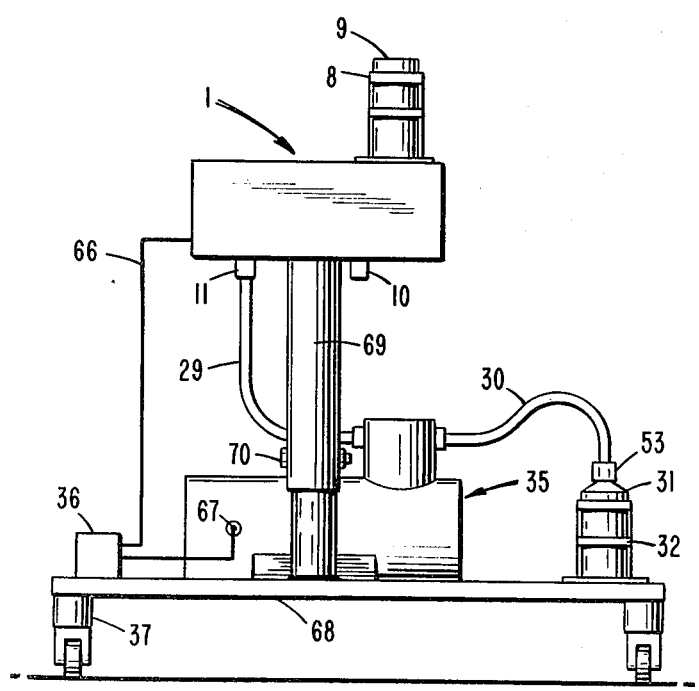
FIG. 4
FIG. 5

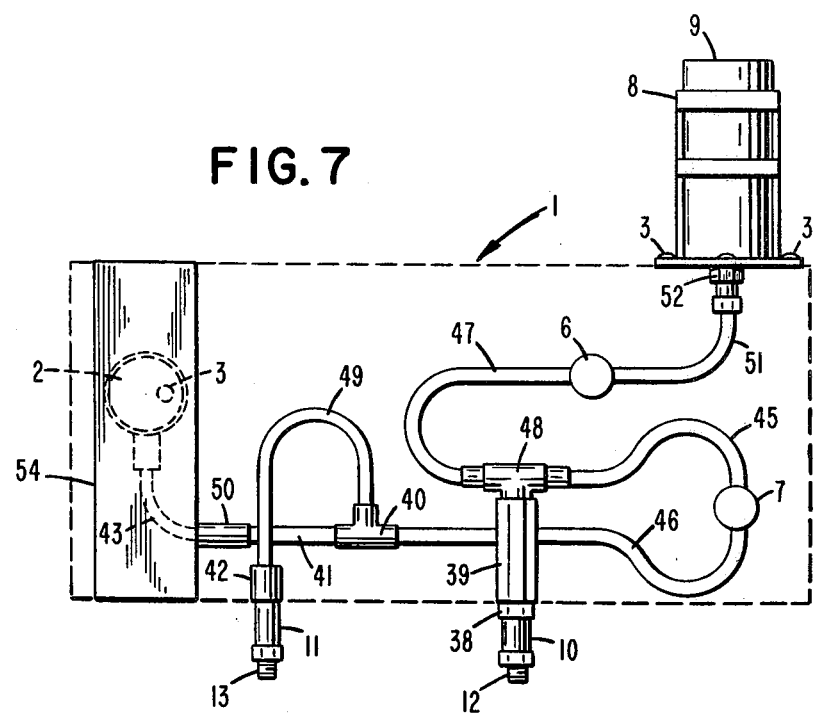

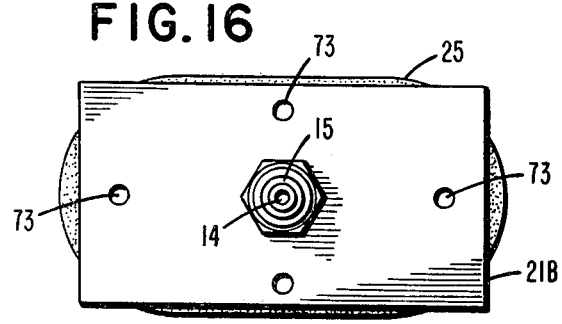
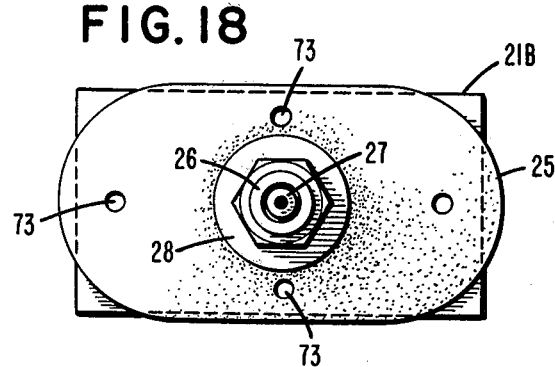
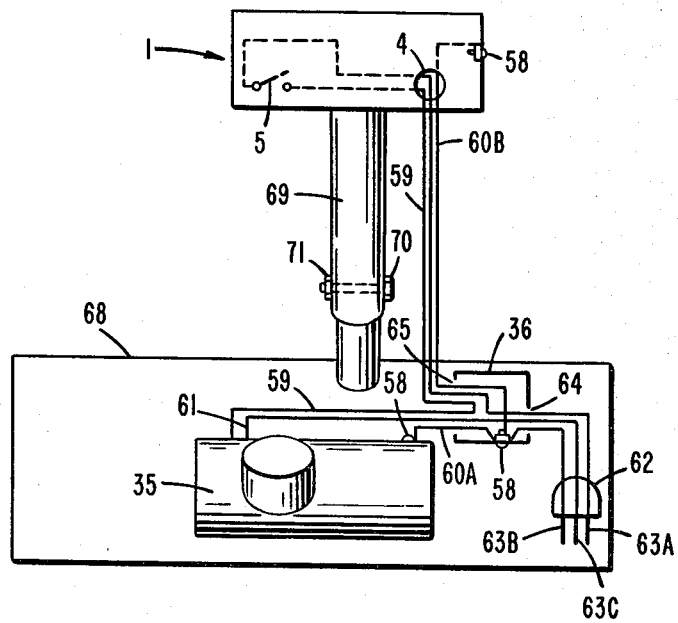

DEVICE FOR BLEEDING BRAKES AND REFILLING BRAKE SYSTEM

BACKGROUND OF THE INVENTION

The present invention relates to a vacuum pump service device, and a gravity fed fluid refill system. More particularly the invention relates to a vacuum pump service device that will remove old brake fluid and air from a motor vehicle's braking system and a gravity fed fluid refill system that will refill the motor vehicle's braking system with new brake fluid.

Object of the invention is to provide a simple service device for extracting air and old brake fluid from a motor vehicle's brake system and replace it with new brake fluid. Traditionally, at least two mechanics are needed to bleed the brake system. One man is needed inside the motor vehicle in order to pump the brakes, while the other mechanic is needed under the motor vehicle in order to bleed the brake system by way of the wheel cylinders. This procedure must be performed on all four wheel cylinders, one at a time. The invention service device will eliminate the need for more than one mechanic. One mechanic will be able to service the brake system of a motor vehicle, and replace old brake fluid with new brake fluid.

BRIEF DESCRIPTION OF THE DRAWINGS

In order that the invention may be readily carried into effect, it will now be described with reference to the accompanying drawings wherein:

FIG. 2 is a schematic diagram of an embodiment of the front view of the Brake Fluid Changing Device with master cylinder reservoir top not shown.

FIG. 3 is a schematic diagram of an embodiment of the right side view of the Brake Fluid Changing Device.

FIG. 4 is a schematic diagram of an embodiment of the backview of the Brake Fluid Changing Device.

FIG. 5 is a schematic diagram of an embodiment of the left side view of the Brake Fluid Changing Device.

FIG. 7 is a block diagram of an embodiment of the back view of the Brake Fluid Changing Device.

FIG. 8 is a block diagram of an embodiment of the right side view of the Brake Fluid Changing Device.

FIG. 9 is a block diagram of an embodiment of the top view of the Brake Fluid Changing Device with fluid reservoir and bracket.

FIG. 10 is a schematic diagram of an embodiment of a front view of the Brake Fluid Changing Device affixed to an adjustable stand mounted on a platform with wheels.

FIG. 16 is a block diagram of an embodiment of the top view of the Brake Fluid Changing Device with modified master cylinder reservoir top.

FIG. 17 is a block diagram of an embodiment of the front view of the Brake Fluid Changing Device with modified master cylinder reservoir top.

FIG. 18 is a block diagram of an embodiment of the bottom view of the Brake Fluid Changing Device with modified master cylinder reservoir top.

FIG. 19 is a block diagram of an embodiment of the back view of the Brake Fluid Changing Device with modified master cylinder reservoir top.

FIG. 20 is a schematic diagram of an embodiment of the electrical system of the Brake Fluid Changing Device.

DETAILED DESCRIPTION OF THE INVENTION

Figure 13:
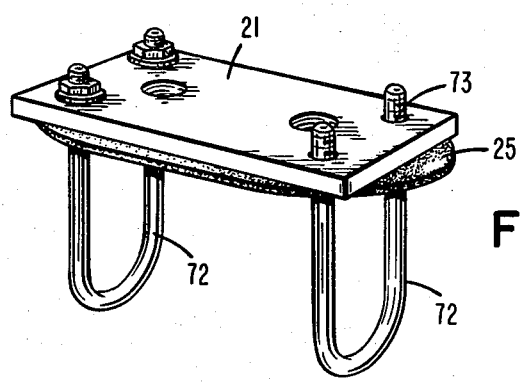
FIG. 13 is a block diagram of an embodiment of the side view of the Brake Fluid Changing Device with master cylinder reservoir top with U-bolts.
Figure 15:
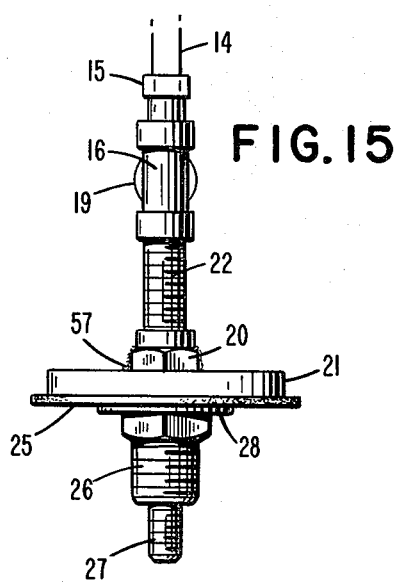
FIG. 15 is a block diagram of an embodiment of the back view of the Brake Fluid Changing Device with master cylinder reservoir top.
Figure 14:
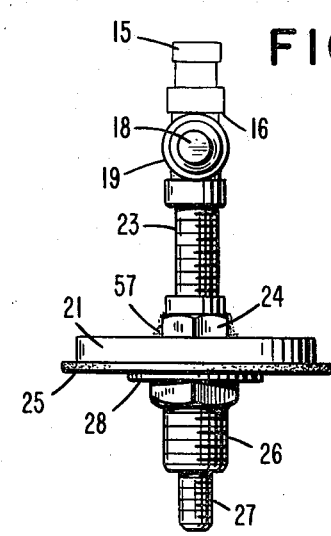
FIG. 14 is a block diagram of an embodiment of the front view of the Brake Fluid Changing Device with master cylinder reservoir top.

Brake Fluid Changing Device of the invention as shown in FIGS. 1 to 20 has a control unit 1 (FIGS. 1 to 10 and 20) affixed to an adjustable stand 69 (FIGS. 1 to 5, 10 and 20) mounted on a platform 68 (FIGS. 1 to 5, 10 and 20) on wheels 37 (FIGS. 1 to 5 and 10), a brake fluid and air extractor unit 31, 35, and 36 (FIGS. 1 to 5 and 20) mounted on a platform 68 (FIGS. 1 to 5, and 20) on wheels 37 (FIGS. 1 to 5), a fluid application container 9 (FIGS. 1 to 7 and 9) affixed to the top of control unit 1 (FIGS. 1 to 7 and 9), and a master cylinder brake reservior top 21 (FIGS. 1,11 to 15) with U-bolts 72 (FIGS. 13). The vacuum pump 35 of the extractor unit 31, 35, and 36 may comprise any known vacuum pump. The master cylinder brake reservoir top 21 (FIGS. 1, 11 to 15) with U-bolts 72 (FIG. 13) can be modified to fit different automobiles and trucks. A modified version of the master cylinder brake reservoir top 21 is shown as master cylinder brake reservior top 21-B (FIGS. 16 to 19).

Figure 1:
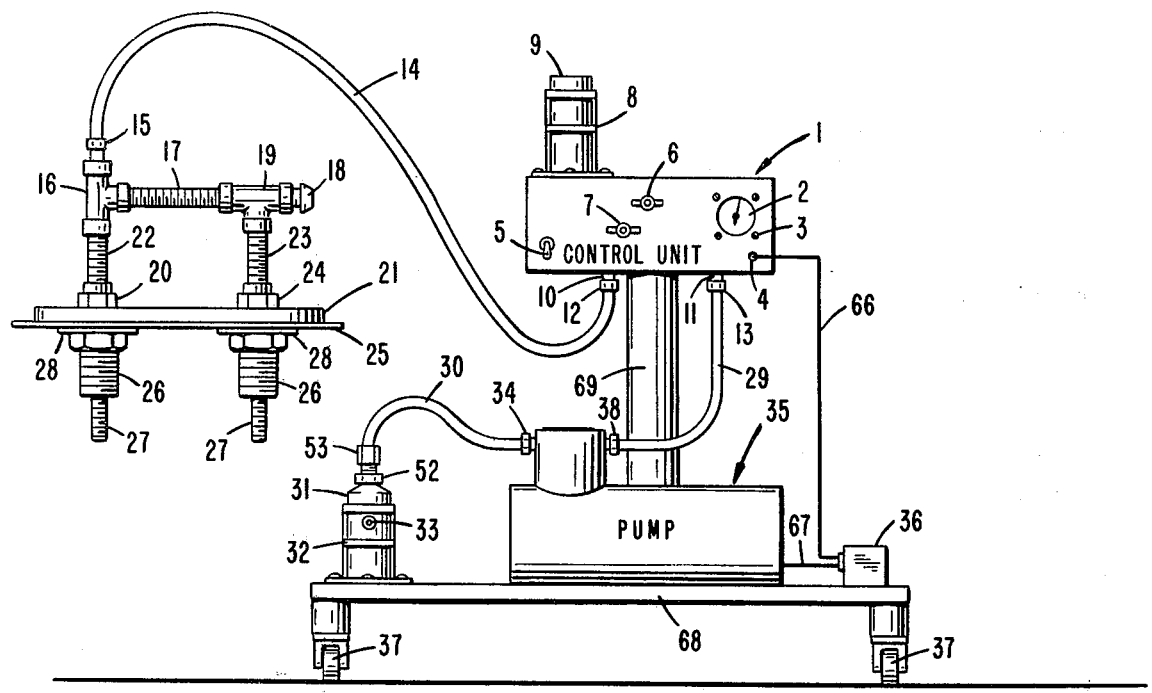
FIG. 1 is a schematic diagram illustrating an embodiment of the Brake Fluid Changing Device with attachments, adjustable stand and platform on wheels.
Figure 6:
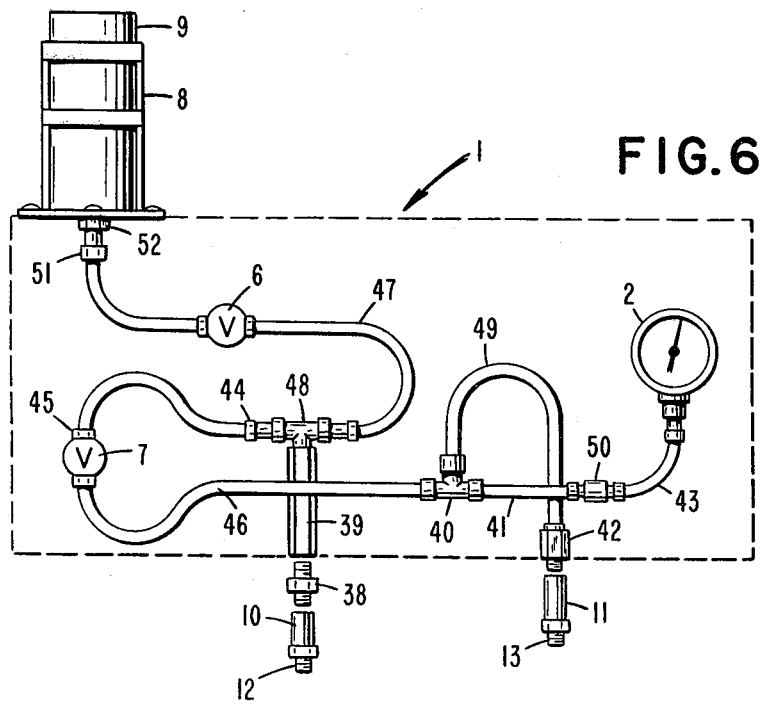
FIG. 6 is a block diagram of an embodiment of the front view of the Brake Fluid Changing Device.

In accordance with the invention, a control unit 1 (FIGS. 1 to 10, and 20) is affixed to an adjustable stand 69 (FIGS. 1 to 5, 10 and 20) mounted on a platform 68 (FIGS. 1 to 5, 10 and 20) on wheels 37 (FIGS. 1 to 5, and 10). The control unit 1 has an electrical on/off switch 5 (FIGS. 1 to 3,5 and 20) with electrical conductors 66 and 67 (FIGS. 1 to 4 and 20), a brake fluid application control valve 6 (FIGS. 1 to 3 and 5 to 7), a vacuum meter indicator 2 (FIGS. 1,2,6 and 8), a brake fluid and air extractor control valve 7 (FIGS. 1 to 3, 5 to 7), a master cylinder brake reservior top 21 (FIGS. 1, 11 to 15) with U-bolts 72 (FIG. 13), and a brake fluid application container (which holds new brake fluid) 9 (FIGS. 1 to 7 and 9) with holding bracket 8 (FIGS. 1 to 7 and 9) attached to the top of the control unit 1. The control unit 1 is attached to the master cylinder brake reservior top 21 (FIGS. 1, 11 to 15) with U-bolts 72 (FIG. 13) by a heavy duty dual function application/extractor hose 14 (FIG. 1). A modified version of the master cylinder brake reservoir top 21 is shown as master cylinder brake reservior top 21-B (FIGS. 16 to 19).

A brake fluid and air extractor unit 31 (FIGS. 1,2,4 and 5), 35 (FIGS. 1 to 5 and 20) and 36 (FIGS. 1 to 4 and 20) mounted on a platform 68 (FIGS. 1 to 5 and 20) with wheels 37 (FIGS. 1 to 5) has a vacuum pump 35

(FIGS. 1 to 5 and 20), a brake fluid collection container with top 31 (FIGS. 1,2,4 and 5) and support bracket 32 (FIGS. 1,2,4 and 5), a heavy duty vacuum hose 29 (FIGS. 1 to 4), a brake fluid collection hose 30 (FIGS. 1,2,4 and 5) and a junction box 36 (FIGS. 1 to 4 and 20). The Vacuum pump 35 (FIGS. 1 to 5 and 20) of the brake fluid and air extractor unit 31,35, and 36 is connected to the control unit 1 by a heavy duty vacuum hose 29 (FIGS. 1 to 4). The brake fluid collection container 31 (FIGS. 1,2,4 and 5) of the brake fluid and air extractor unit 31, 35 and 36 is connected to the vacuum pump 35 by a brake fluid collection hose 30 (FIGS. 1,2,4 and 5).

Power is supplied to the Brake Fluid Changing Device by plugging rubber pron 62 (FIG. 20) into a 115 volt electrical wall outlet. Rubber pron 62 contains 3 lead wires 63A, 63B and 63C (FIG. 20) of which 63A is positive power lead, 63B is grounding lead, and 63C is negative power lead. Lead 63A of pron 62 will carry positive power from the positive side of the wall outlet. Lead 63B of pron 62 will ground all parts of the grounding wire to the wall outlet thereby grounding the system to the wall outlet ground. Lead 63C will carry negative power back to the negative side of the wall outlet.

Positive power will travel from the positive side of the wall outlet to lead 63A of rubber pron 62. Wire 59 is connected to lead 63A. Power will travel from lead 63A to wire 59. Wire 59 will carry the positive power to the junction box 36 (FIG. 20), and then to switch 5 (FIG. 20). From switch 5, power travels by wire 59 to junction box 36 (FIG. 20). Wire 59 continues from junction box 36 (FIG. 20) to the positive side of the vacuum pump 35 (FIG. 20). Wire 61 (FIG. 20) leaves the negative side of vacuum pump 35 (FIG. 20) goes to junction box 36, and continues from junction box to lead 63C (FIG. 20) of rubber pron 62 (FIG. 20). Lead 63C (FIG. 20) carry the negative power back to the negative side of wall outlet.

The control unit 1 (FIG. 20) is grounded by ground wire 60B (FIG. 20) from control unit ground screw 58 to junction box ground screw 58 (FIG. 20). The vacuum pump is grounded by ground wire 60A from vacuum pump ground screw 58 to ground screw 58 (FIG. 20) in junction box 36 (FIG. 20). Grounding wire 60 (FIG. 20) which is connected to ground screw 58 in junction box provides a grounding path to ground lead 63B (FIG. 20) of rubber pron 62 to electrical wall outlet.

The following list is an explanation of the numbered parts of the invention:

1. Brake Fluid Changing Devices (FIGS. 1 to 10 and 20).
2. Vacuum Meter indicator (FIGS. 1,2,6, and 8).
3. Screw (FIGS. 1 and 7).
4. Opening for switch wire (FIGS. 1,2 and 20).
5. On/off power control switch (FIGS. 1 to 3,5 and 20).
6. Application control valve (FIGS. 1 to 3 and 5 to 7).
7. Extractor control valve (FIGS. 1 to 3 and 5 to 7).
8. Bracket to hold brake fluid container (FIGS. 1 to 8).
9. Brake fluid container (FIGS. 1 to 7 and 9).
10. Pipe couple (FIGS. 1 to 2 and 4 to 7).
11. Pipe couple (FIGS. 1 to 4,6 and 7).
12. Half union couple flare to M.P.T. (metal pipe thread to tube) (FIGS. 1,6 and 7).
13. Half union couple flare to M.P.T. (FIGS. 1 to 3, 6 and 7).
14. Heavy duty dual function application/extractor hose (FIG. 1).
15. Half union couple flare to M.P.T. (FIGS. 1,11,14 to 17 and 19).
16. B-tee (3 openings) (FIGS. 1,11,14 and 15).
17. Long nipple pipe with thread (FIGS. 1 and 11).
18. Plug (FIGS. 1,11 and 14).
19. B-tee (3 openings) (FIGS. 1,11 and 14).
20. Nut (FIGS. 1,11 and 15). 21. Master cylinder reservoir top (FIGS. 1,11 to 15).
21B Modified master cylinder brake reservoir top (FIGS. 16 to 19).
22. Long nipple pipe with thread (FIGS. 1 and 15).
23. Long nipple pipe with thread (FIGS. 1 and 14).
24. Nut (FIGS. 1,11 and 14).
25. Rubber gasket seal (FIGS. 1,12,14,15,17 to 19).
26. Brass hexagon pipe bushing with thread inside and outside (FIGS. 1,12,14,15,17 to 19).
27. Long nipple pipe with thread (FIGS. 1,14,15,17 to 19).
28. Washer (FIGS. 1,12,14,15,17 to 19).
29. Heavy duty vacuum hose (FIGS. 1 to 4).
30. Hose to collect old brake fluid and air from vacuum pump (FIGS. 1,2,4 and 5).
31. Brake fluid collection container with top to collect old brake fluid and air from vacuum pump (FIGS. 1,2,4 and 5).
32. Collection container support bracket (FIGS. 1,2,4 and 5).
33. Release hole (release air from fluid) (FIG. 1).
34. Half union coupling flare to M.P.T. (FIG. 1).
35. Vacuum pump (Motor) meter (Extractor) (FIGS. 1 to 5 and 20).
36. Junction box (FIGS. 1 to 4 and 20).
37. Platform wheel (FIGS. 1 to 5 and 10).
38. Half union coupling flare to M.P.T. (FIGS. 1,6 and 7).
39. Coupling tube (tube to tube) (FIGS. 6 and 7).
40. Brass compression union tees, tube to tube to tube (FIGS. 6 and 7).
41. Copper tube with brass compression nuts (FIGS. 6 and 7).
42. Brass compression male connectors tube to M.P.T. (FIGS. 6 and 7).
43. Elbow female thread pipe thread (FIGS. 6 and 7).
44. Tube with compression nuts (FIG. 6).
45. Tube with compression nuts (FIGS. 6 and 7).
46. Copper tube with brass compression nuts (FIGS. 6 and 7).
47. Copper tube with brass compression nuts (FIG. 6).
48. Brass compression union tees, tube to tube to tube (FIGS. 6 and 7).
49. Copper tube U-shape with compression nuts (FIGS. 6 and 7).
50. Brass compression male connectors tube to M.P.T. (FIGS. 6 and 7).
51. Copper tube with brass compression nuts (FIGS. 6 and 7).
52. Brass compression male connectors tube to tube (FIGS. 1,6 and 7).
53. Half union coupling flare to M.P.T. (FIGS. 1 and 4).
54. Frame that vacuum meter is on (FIGS. 7 and 8).
55. Screw (FIG. 8).
56. Plastic glass covering vacuum meter. (FIG. 8).
57. Seal (FIGS. 14 and 15).
58. Ground for grounding wire (FIG. 20).

Figure 11:
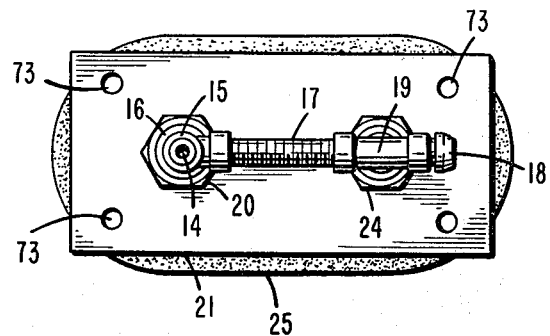
FIG. 11 is a block diagram of an embodiment of a top view of the Brake Fluid Changing Device with master cylinder reservoir top.
Figure 12:
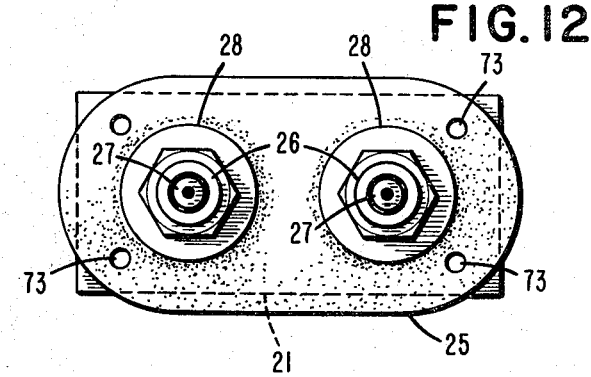
FIG. 12 is a block diagram of an embodiment of a bottom view of the Brake Fluid Changing Device with master cylinder reservoir top.

59. Hot wire (FIG. 20).
60. Ground wire (branches into ground wires 60A and 60B) (FIG. 20).
60A Ground wire to vacuum pump (FIG. 20).
60B Ground wire to control unit (FIG. 20).
61. Negative wire (FIG. 20).
62. Rubber pron (FIG. 20).
63. Ground lead (branches-positive lead 63A, ground lead 63B and negative lead 63C) (FIG. 20).
63A Positive ground lead (FIG. 20).
63B Ground lead (FIG. 20).
63C Negative ground lead (FIG. 20).
64. Opening for wire to come into junction box (FIG. 20).
65. Opening for wire coming out of junction box (FIG. 20).
66. 3 wire conductor (2 hot and 1 ground wire) from junction box to control unit (FIGS. 1 to 4 and 20).
67. 3 wire conductor (1 hot, 1 negative, and 1 ground) from junction box to vacuum motor (FIGS. 1 to 4 and 20).
68. Platform on wheels (FIGS. 1 to 5, 10 and 20).
69. Adjustable stand (FIGS. 1 to 5, 10 and 20).
70. Bolt to adjustable stand (to adjust it) (FIGS. 3 to 5,10 and 20).
71. Nut (FIGS. 2,4,10 and 20).
72. U-bolt to secure master cylinder brake reservoir top to master cylinder (FIG. 13).
73. Opening for U-bolt (FIGS. 11 and 16).

To operate, the Brake Fluid Changing Device must be plugged into an electrical outlet. The brake fluid reservoir top 21, as shown in FIG. 1 must be secured to the master cylinder of the motor vehicle (not shown). To remove old brake fluid and air, turn the brake fluid application control valve 6 to the off position, turn the brake fluid extraction control valve 7 to the on position, and turn the on/off switch 5 to the on position. The on/off switch 5 in the on position will cause the vacuum pump 35 to create a suction action which will cause old brake fluid and air to be extracted from the braking system through the master cylinder (not shown) through the dual function application/extraction hose 14 to the control unit 1 through the extraction control valve 7 through the heavy duty vacuum hose 29 to the vacuum pump 35 through the brake fluid collection hose 30 to the brake fluid collection container 31. To apply new brake fluid, turn the brake fluid extraction control valve 7 to the off position, turn the on/off switch 5 controlling the vacuum pump 35 to the off position, and turn the brake fluid application control valve 6 to the on position. New brake fluid will flow by gravity from the brake fluid application container 9 to the control unit 1, through the application control valve 6, through the dual function extraction/application hose 14 to the master cylinder brake reservoir top 21 into the master cylinder (not shown) to all parts of the vehicle braking system. When the level (brake fluid) in the brake fluid application container 9 stops dropping, the master cylinder should be full. The mechanic may now stop the application by turning the brake fluid application control valve to the off position. The pumping action of the brake pedals during the operation will cause the brake fluid to be circulated throughout the brake system. Continue this operation until the brake fluid level in the brake fluid application container stops dropping. When the operation is completed, the brake fluid changing device can be detached from the master cylinder and the master cylinder cap replaced.

While the invention has been described by means of a specific example and in a specific embodiment, we do not wish to be limited thereto, for obvious modifications will occur to those skilled in the art without departing from the spirit and scope of the invention.

We claim:

1. A brake fluid changing device for changing brake fluid and bleeding the brake system of automobiles and trucks, the device having a control unit affixed to an adjustable stand mounted on a platform on wheels, a brake fluid and air extractor unit mounted on the platform on wheels, a brake fluid application container affixed to the top of the control unit, the control unit having an electrical on/off switch with electrical conductors, a brake fluid application control valve, a vacuum meter indicator, a brake fluid and air extractor control valve, a brake fluid application container and a master cylinder brake reservoir top with U-bolts, and controls means for controlling the operation of the fluid changing device, said control unit controlling the brake fluid and air extractor unit by the electrical on/off switch and a brake fluid and air control valve, the control unit of changing device controlling the brake fluid application by way of the brake fluid application control valve, the control unit being connected to the master cylinder brake reservoir top by a heavy duty dual function extractor/application hose and the control unit being connected to the brake fluid and air extractor unit by a heavy duty vacuum hose, the brake fluid and air extractor unit of the fluid changing device having a vcuum pump, a brake fluid collection container, a brake fluid collection hose, a heavy duty vacuum hose, and a junction box, the vacuum pump of the extractor unit being connected to the control unit by a heavy duty vacuum hose, the vacuum pump being connected to the brake fluid collection container by a brake fluid collection hose, the junction box of the extractor unit being connected to the control unit by electrical conductors, the control unit of the brake fluid changing device controlling the action of the extractor unit such that the electrical on/off switch located on the control unit controls the suction action of the vacuum pump, with the master cylinder brake reservoir top secured to the master cylinder of the vehicle, the on/off switch in the on position, the brake fluid application control valve in the closed position, and the brake fluid and air extractor control valve in the open position, the suction action of the vacuum pump causes the brake fluid and air to be extracted from the master cylinder of the motor vehicle's brake system, through the extractor/application hose to the control unit, through the heavy duty vacuum hose to the vacuum pump, through the brake fluid collection hose to the brake fluid collection container, new brake fluid being applied to the brake system by closing the brake fluid and air extractor control valve, by turning the electrical on/off switch to the off position, and by opening the brake fluid application control valve thereby new brake fluid travels from the brake fluid application container through the brake fluid application control valve to the control unit through the dual function extractor/application hose, through the master cylinder brake reservior top into the master cylinder into the motor vehicle brake system with the brake fluid application being closed when the master cylinder is full by pumping the brake pedal which pedal action causes brake fluid to be circulated throughout the brake system, and continuing this operation until brake fluid level in the brake fluid container stops dropping.

* * * * *